United States Patent Office 3,100,929
Patented Aug. 20, 1963

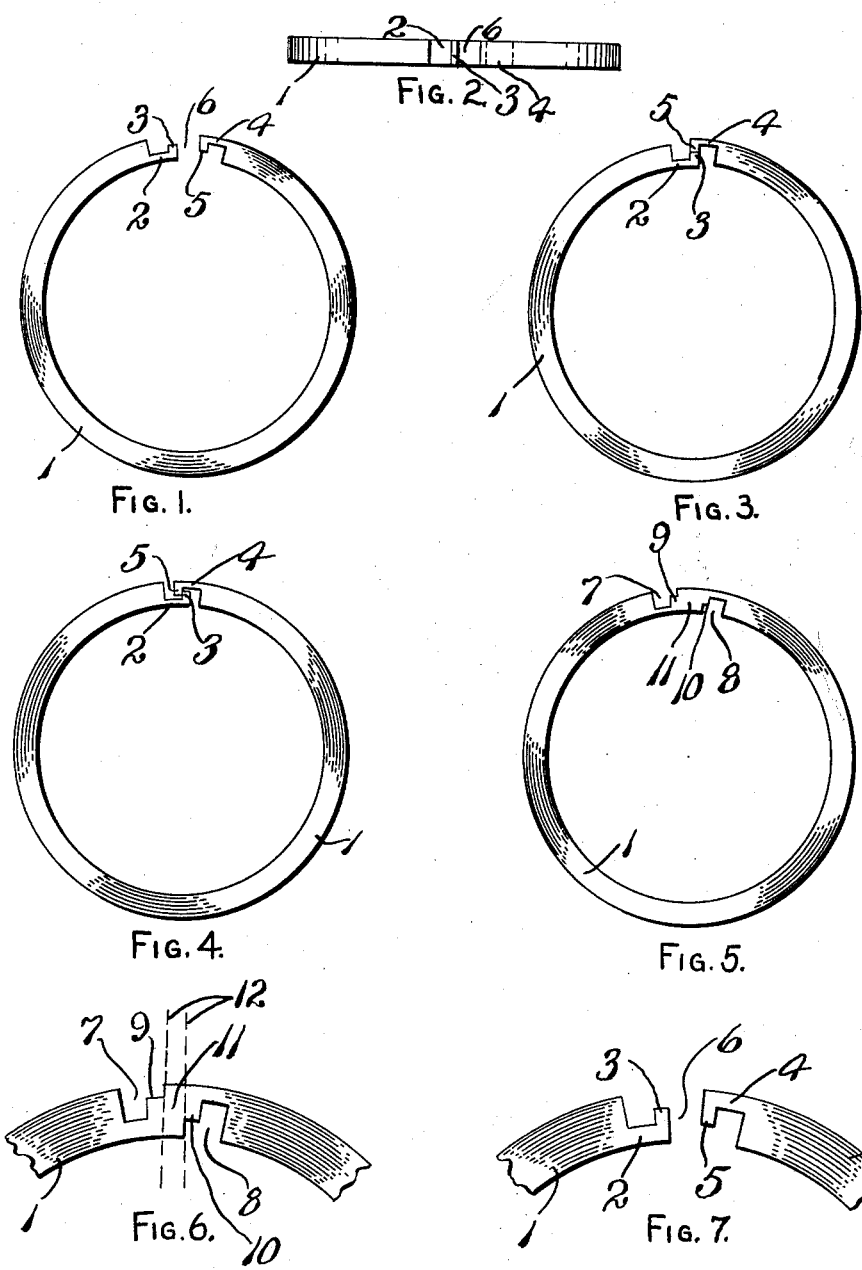

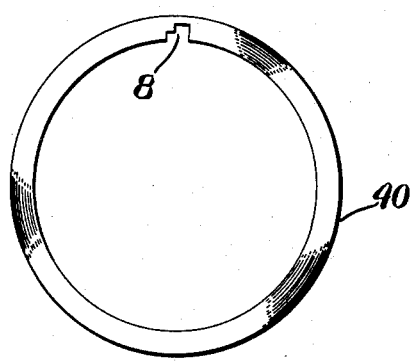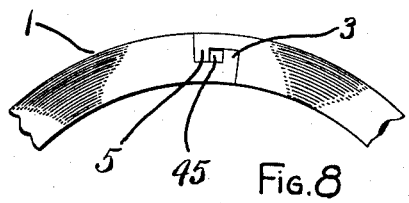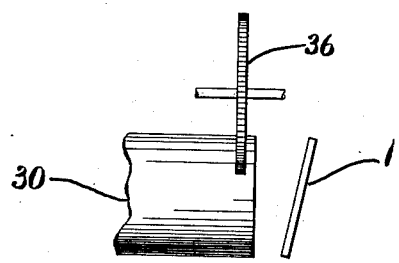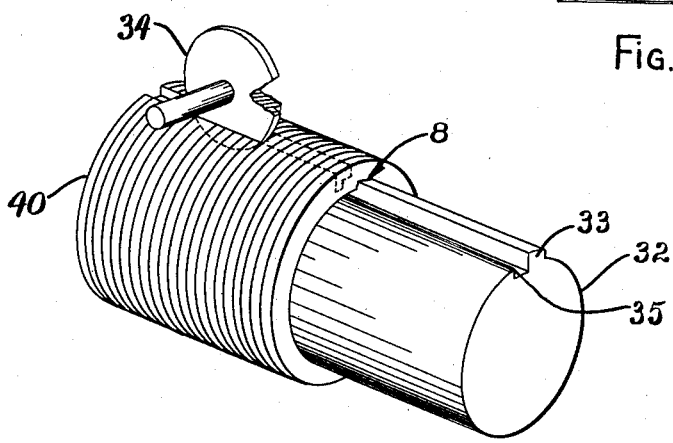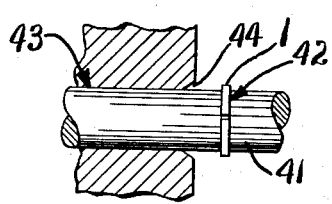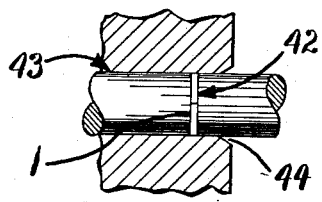

3,100,929
LOCK JOINT SEALING RING
Kenneth J. Nisper, Muskegon, Mich., assignor to Muskegon Piston Ring Company, Muskegon, Mich., a corporation of Michigan
Original application July 3, 1957, Ser. No. 669,893. Divided and this application May 1, 1959, Ser. No. 810,511
2 Claims. (Cl. 29—156.6)

This application is a division of my co-pending application Serial No. 669,893, filed July 3, 1957, now abandoned, entitled Lock Joint Sealing Ring.

The present invention relates to sealing rings of the type used in blind assemblies. In such an assembly, the sealing ring is installed in a groove on a shaft. This is normally at a point intermediate the ends of the shaft. The ring is circumferentially expanded to permit it to be passed down the shaft to the groove. The rings are necessarily split or parted at one place for this purpose. When the shaft, with the ring assembled on it, is inserted in a bore, the ring is contracted and the gap at the parting is closed. Frequently, the entrance of the sealing ring into the bore cannot be observed and manipulation of the ring at this point is difficult and often impossible. Therefore, the ring's parting must be nearly closed as it comes to the bore entrance, permitting it to enter without danger of breakage. If the parting is not substantially closed at this point, breakage is likely to occur.

In my invention, cooperating hooks are provided at the parting or gap in the sealing ring. These hooks are passed one over the other, after the ring is installed in its groove. The hooks interengage to hold the ring to a smaller outside diameter, with the parting nearly closed. The entrance to the bore is normally chamfered. The contracted ring, as it enters the bore, will be further contracted bp the chamfer. This contraction is relatively small and will occur without the danger of breakage which exists if substantial circumferential contraction must occur at this point.

Conventional construction of these rings employs hooks which must be moved sideways of the ring to effect engagement and locking.

With my invention the hooks are designed for radial movement to pass over each other. The ring is resilient, returning the hooks to normal position when freed from the outward pulling force applied to pass one over the other. Upon release, hooks engage with each other and the ring is retained in nearly fully contracted position.

It is an object and purpose of my invention to provide a lock sealing ring which may be readily fabricated from a casting, or a molded, powdered metal, sintered blank. The sideways opening lock for this type of ring requires machining of each individual ring. This is excessively expensive. It is, for all practical purposes, impossible to cast or mold from powdered metal the lock configuration required for the sideways opening type of ring. This invention eliminates this problem, making it feasible to cast or mold the rings with all or part of the lock configuration. If the configuration is only partially formed in the casting or molding operation, or finish machining is required to hold accurate dimensions, this machining may be performed on large groups of rings simultaneously.

The use of the radially, rather than laterally parted hooks facilitates their engagement when the ring is installed. This is particularly true of rings designed for the larger diameter shafts. The resistance to radial expansion is less than that to lateral twisting and interconnection of the hooks is more easily accomplished.

My invention for the attainment of the ends stated, and others not at this time enumerated, but which will later appear, may be understood from the following description, taken in connection with the accompanying drawings.

In the drawings:

FIG. 1 is a side elevation view of the lock sealing ring of my invention with the ring open.

FIG. 2 is a plan view thereof with the ring open.

FIG. 3 is a side elevation view similar to FIG. 1 showing one of the hooks at the parting pulled radially outward and passing over the other hook.

FIG. 4 is a side elevation view, similar to FIG. 3 showing the hooks engaged and the ring partially contracted as it is when installed in its groove.

FIG. 5 is a side elevation view of a casting or blank from which the ring is made.

FIG. 6 is a fragmentary enlarged side elevation view of the upper portion of the ring shown in FIG. 5, illustrating the lines of milling or cutting across the ring to provide the open parting and the hooks.

FIG. 7 is a fragmentary, enlarged side elevation view identical to FIG. 6, illustrating the ring after machining.

FIG. 8 is an enlarged fragmentary side elevation view identical to FIG. 7 but illustrating the ring when fully contracted and as used as a seal.

FIG. 9 is a side elevation view of a modified casting or blank for the sealing ring.

FIG. 10 is an oblique, somewhat schematic view of the machining of the casting or blank illustrated in FIG. 9.

FIG. 11 is a fragmentary view of a shaft being inserted in its bore.

FIG. 12 is a fragmentary view similar to FIG. 11, showing the shaft seated in operating position.

FIG. 13 is a side elevation, somewhat schematic view of the separation of individual rings from a tubular blank.

Referring specifically to the drawings, the sealing ring 1 is of suitable metal and of generally circular form and uniform, rectangular cross section. It is transversely parted at a side thereof and formed with two hooks at this parting, one at each side thereof. One of these hooks has a shank 2 at the inner curved side of the ring, terminating in an outwardly extending hook portion 3 at its free end. The other hook has a shank 4 at the outer side of the ring terminating at its free end in an inwardly extending hook portion 5. The hooks extend toward each other as shown, the first being at the inner side of the ring and the other at the outer side thereof. They are separated normally by a space or gap 6 at their adjacent ends.

The ring may be contracted for locking by moving the hooks toward each other, pulling the outer hook radially outward and over the inner hook 3, (FIG. 3) until the outer hook reaches the position illustrated in FIG. 4. In this position, the hooks will interengage and hold the ring in contracted position. It is apparent that the outer hook portion 5 is moved radially outward a short distance in passing over the inner hook but returns to engage behind the inner hook 3 upon reaching the position shown in FIG. 4. The radial movement necessary to effect this is small and is accomplished easily with the ring installed in the ring groove of a shaft.

When thus contracted and the ends hooked together at the parting, the ring will readily enter the core designed for it. As it enters the bore it will be contracted further with the hooks 3 and 5 separating and breaking contact, moving to the opposite ends of the shanks 4 and 2 respectively. The outer curved face or side of the ring bears against the bore in which the ring is installed with a predetermined pressure resulting from the resiliency of the ring. This effects the seal.

The ring is made from a blank such as that shown in FIG. 5. This blank may be cast or molded from powdered metal. If cast, the rings normally are individually formed or it is possible to cast an elongated tube from which the individual rings are cut as by a slicing operation. If formed from powdered metal, the rings are individually molded.

The blank is provided with outer and inner recesses 7 and 8 at the location of the parting. These recesses are spaced from each other a short distance creating a segment 11. The recesses have a shoulder 9 and 10 respectively providing a notch of lesser radial depth. These shoulders are adjacent the segment 11.

The ring is formed by removing the segment 11 between the radial dash lines 12 in FIG. 6. This may be done by any suitable machining operation and leaves the gap or opening 6 and the terminal hook portions 3 and 5 as shown in FIG. 7.

This invention is significant in the economy effected in the manufacture of the rings. In the manufacture of conventional locking rings having laterally extending hooks as contrasted with the radially extending ones of this invention, each ring must be separately machined to create the hooks. This is the result of the necessity for machining the rings radially rather than laterally. Individually machined locking rings are excessively expensive.

Locking rings of conventional design are not adapted to molding from powdered metal because this method requires uniformity of wall thickness in the direction of the application of pressure. Since the pressure is applied laterally of the ring, conventional locking rings must be molded as a simple circular blank and the hooks formed by machining.

The present invention eliminates these difficulties. If the rings are cast, they may be individually cast with the inner and outer recesses 8 and 7 formed in the metal casting. The cast rings may be assembled in groups and the recesses machined to make them accurate in both width and depth if such is necessary. If this is not necessary they may be machined in groups to remove the segment 11. Even where finish machining of the recesses 7 and 8 is necessary, this may be done rapidly since only a small quantity of material is removed. Further, the rings may be machined in groups, effecting a substantial saving in machining expense. Where the rings are individually cast or molded or powdered metal, the ring blanks 40 are initially formed with the inner recess 8 of accurate size and shape (FIG. 9). The rings are then assembled in columns on a mandrel 32 (FIG. 10) of suitable size and equipped with a locating ridge 33. The locating ridge 33 is designed to closely fit the inner recess 8. The exterior recess is then cut in the assembled rings as a group by a suitably shaped cutter 34.

The mandrel 32 may be provided with a channel 35 adjacent the ridge 33. The channel 35 provides clearance for the passage of a second cutter to remove the segment 11 and form the opening in the ring. In this operation the outer recess is formed in a large group of rings in a single pass of the cutter 34. The same is true of the removal of the segment 11 to create the split or gap in the ring.

As stated above, a basic way of making the ring blank is to mold it under pressure from sintered, powdered metal. While it is possible to mold both the inner and outer recesses in the blank, it is preferable to mold only one of the recesses. This permits the use of simpler, less costly and more durable tools for the molding operation. When this is done, the inner recess 8 is molded into the blank 40 (FIG. 9). This recess is chosen because its subsequent machining is slow and costly. It is relatively inaccessible and requires the use of more expensive machine tooling. Further, it is exceedingly difficult to machine the inner recess except in individual ring blanks. By comparison, the outer recess 7 is comparatively easy to machine because of its accessibility.

As a variation of this method, the tubular stock having the inner recess formed in it as a groove of accurate size and shape is placed on the mandrel and the outer recess is formed by machining. The segment 11 is then removed and the split tube sliced into rings by an appropriate cutter 36 (FIG. 13). It will be recognized that the slicing operation may be performed before the removal of the segment. However, this will involve additional manufacturing steps as the rings must then be either individually machined or assembled in groups for this purpose.

To install the locking ring, the shaft 41 is provided with a sealing ring groove 42 (FIGS. 11 and 12). The ring 1 is expanded by circumferentially widening the gap between the ends until it can be passed axially along the shaft 41 to the groove 42. Once it is seated in the groove the ends are hooked or locked as illustrated in FIG. 4. The outer diameter of the locked ring is slightly greater than that of the shaft 41 as indicated in FIG. 11 due to the recesses 7 and 8 being of greater circumferential length than the hooks 3 and 5. The differential in diameter between the locked ring and the shaft is exaggerated in FIG. 11. The shaft is moved axially into the bore 43. As the ring is moved into the bore, the chamfer 44 closes the ring to the size of the bore (FIG. 12). In this condition the hooks 3 and 5 are moved to the opposite ends of their recesses (FIG. 8). To move the hooks to the ends of their recesses and at the same time avoid any binding due to the closed ring being slightly oversize requires very accurate fabrication of the hooks and recesses.

While the closed ring has a central aperture 45 (FIG. 8) between the hooks 3 and 5, this does not result in leakage past the ring. The vital seal which must be formed is at the surface of the walls of the bore 43 to form a barrier against the migration of liquids or gases between the shaft surface and the walls of the core. The natural resilience of the sealing ring 1 assures a tight sealing engagement between the outer face of the sealing ring and the walls of the bore, creating this barrier. The walls of the ring groove 42 fit closely against the lateral faces of the ring and to a large extent prevent the entrance of the fluid into the groove where it would have access to the aperture 45. Thus, the presence of the aperture does not result in significant leakage. The fit of the sealing ring 1 in the groove 42, while as close as possible must not result in any binding of the ring. Such would tend to prevent the ring from maintaining a positive seal with the walls of the bore 43.

It will be seen from this description that it is important that the outer hook 5 seat as closely as possible against the end of the recess 7 because any gap at this point creates a breach in the seal with the walls of the core. Any appreciable gap at this point will result in leakage.

There is thus provided a novel lock joint sealing ring, normally open at its parting a predetermined distance, with cooperating hooks adapted for ready interlocking engagement by passing the outer hook over the inner hook with minimum strain and force required. The hooks hold the ring contracted sufficiently that the ring readily enters the bore in which the shaft is received.

It is especially easy to interlock the hooks irrespective of the sizes of the sealing rings. With rings of conventional design this has been difficult, particularly in the case of the larger dimensional sealing rings. In the larger rings the lateral displacement of the hooks to effect locking requires the application of substantial force. This is due in part to the thickness of the material, the natural resistance of a ring shaped object of the type to lateral twisting and the fact that the structure required displacement to the full lateral thickness of the ring. The present design takes advantage of the greater ease of circumferential enlargement. Also it requires displacement equal only to the radial height of the hooks from the bottoms of the recesses. This is but a fraction of the lateral thickness of the ring.

While I have described my invention and a method of making it together with several modifications of both the product and the method, other modifications may be made retaining the principles of the invention. Each of the modifications are to be considered as included in the hereinafter appended claims, unless the claims by their language expressly state otherwise.

I claim:

1. In the method of making a parted locking sealing ring, the steps which include: providing an annular blank; cutting said blank in an axial direction to form a first recess extending from one side face to the other and opening through the inner radial face of the blank, said recess extending axially of said blank; at a point circumferentially spaced from said first recess cutting said blank in an axial direction to form a second recess extending from one side face to the other and opening through the outer radial face of said blank, removing the portion of said blank between said recesses to space the ends of said sealing ring from each other.

2. In the method of making a parted locking sealing ring, the steps which include: providing a plurality of annular blanks each having a first recess opening through the inner radial face of said blanks, said recess extending axially of said blank, providing a fixture having a locating wall; mounting said blanks in a column on said fixture with said first recesses seated about said wall and using said wall when seated in said recesses to position all of said blanks in alignment, at a point circumferentially spaced from said first recesses cutting said blanks in an axial direction to form a second recess in said column of blanks extending the entire length of said column, the resulting recess in each blank opening through the radially outer faces of the blank, locating the circumferential spacing of said recess from said wall, removing the portion of said blank between said recesses to space the ends of each sealing ring from each other, locating the portion of said blank so removed from said wall.

References Cited in the file of this patent

UNITED STATES PATENTS

| | | |
|---|---|---|
| 1,188,370 | Gill | June 20, 1916 |
| 1,285,820 | Smith et al. | Nov. 26, 1918 |
| 1,996,603 | Wuerfel | Apr. 21, 1935 |
| 2,099,712 | Wilkening | Nov. 23, 1937 |
| 2,183,358 | Six | Dec. 12, 1939 |
| 2,337,997 | Hiromi | Dec. 28, 1943 |
| 2,471,650 | Pandolfi | May 31, 1949 |
| 2,482,990 | Olson | Sept. 27, 1949 |
| 2,602,988 | Klym | July 15, 1952 |
| 2,652,620 | Sutowski | Sept. 22, 1953 |
| 2,703,920 | Parker | Mar. 15, 1955 |